Patented Oct. 19, 1937

2,096,441

UNITED STATES PATENT OFFICE 2,096,441

PRODUCTION OF MORPHOLINE VINYL ETHERS AND RELATED COMPOUNDS

Alexander L. Wilson, Pittsburgh, Pa., assignor, by mesne assignments, to Union Carbide and Carbon Corporation, a corporation of New York No Drawing. Application July 19, 1934, Serial No. 736,041

21 Claims. (Cl. 260—28)

This invention relates to the vinyl alkyl ethers of morpholine, and their homologues and related compounds; and to a process of making the same. The process involves reacting together a $\beta\beta'$ dihalogenated dialkyl ether with morpholine, a substituted morpholine, or with a mixture of the said ether and an excess of ammonia which interact to form morpholine or a homologue thereof. The reaction preferably is conducted in the presence of an aqueous solution, or of a suitable volatile solvent such as methanol. The resultant reaction products are then reacted with an aqueous solution of a fixed alkali, such as caustic soda. The morpholine vinyl ether or homologues thereof thus produced may then be recovered in a number of ways hereinafter indicated.

The reaction mixture must be maintained alkaline during the first step of the process, either by the use of an excess of ammoniacal solution, an excess of morpholine with or without diluent, or, as in the reaction of morpholine with dichloroisopropyl ether, by caustic alkali. For the decomposition of the dimorpholinium chloride or intermediate product, to produce the morpholine vinyl ether or homologue thereof, a strong base such as sodium hydroxide is required.

When in the process, $\beta\beta'$ dichlorodiethyl ether, i. e. bis-beta-chlorethyl ether, is the dihalogenated ether utilized, there is produced N morpholine 2-ethyl vinyl ether, as a final product. The latter is a mobile, mildly odorous, colorless liquid having a boiling point of 209° to 211° C., and a specific gravity of 1.00 at 20° C. It is completely miscible with water and paraffin oil, and it is strongly basic.

The process is illustrated by the following examples:

Example 1

1850 grams of $\beta\beta'$ dichlorodiethyl ether, and 12,700 grams aqueous ammonia, giving a molar ratio of 14 of ammonia to 1 of ether, were reacted in an autoclave at 50°–55° C. for 80 hours with constant agitation. The reaction products were then distilled to remove unreacted dichlordiethyl ether and water, thus concentrating the product to the point where ammonium chloride produced in the reaction precipitated. This with small amounts of iron oxide present were then removed by filtration. The filtrate was then further concentrated to the saturation point of the boiling solution. Upon cooling the solution the mass partly solidified. This residue was then treated with strong aqueous caustic soda solution in excess of the amount required to react with the intermediate N-bis morpholinium chloride to form the corresponding hydroxide. The resultant solution was extracted with benzene in the cold for isolating the free amines. The benzene extract was then distilled, and the fraction distilling over between 198°–208° C. was separately recovered. This fraction was very rich in the N morpholine 2-ethyl vinyl ether, which is purified by redistillation, and which has a boiling point of 210° C. Another fraction of the benzene extract contains substantial amounts of morpholine.

It seems probable that the primary reaction product of $\beta\beta'$ dichloro-di-ethyl ether and the ammonia is morpholine as indicated in the equation:

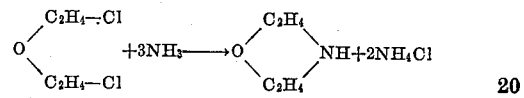

This then reacts with another molecule of the dichlordiethyl ether and ammonia to form the spirocyclic quaternary amine chloride:

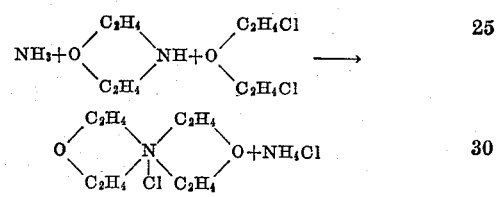

N-bis morpholinium chloride.

Treatment of this amine chloride with caustic soda or similar strong base produces:

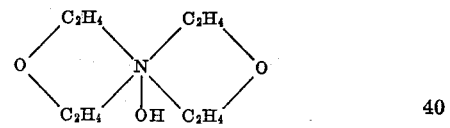

N, 2 morpholinium hydroxide, which readily decomposes to form N morpholine 2-ethyl vinyl ether, having the probable formula:

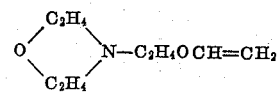

The time required for the initial reaction with ammonia may be greatly reduced by increasing somewhat the temperature at which the reaction is conducted. Moreover, under certain conditions the step of solvent extraction of the initial reaction residues is unnecessary.

Example 2

A high yield of N morpholine 2-ethyl vinyl ether has been secured by reacting together for four hours in an autoclave, 95 parts by weight of $\beta\beta'$ dichlordiethyl ether and 107 parts of anhydrous ammonia in 278 parts of water. This reaction was conducted at 55 pounds per square inch pressure, and the temperature rose from 75° to 90° C. during the reaction. The molar ratio of ammonia to dichlordiethyl ether was 10 to 1.

The autoclave product was directly distilled to a boiling point of 120° C., thus removing most of the water and ammonia. Thereupon the residual liquor was treated with an excess of 50% aqueous solution of caustic soda and the resultant mixture distilled to 124° C. The distillate resulting from the continued distillation of the caustic solution contains the morpholine vinyl ether, together with morpholine, water and ammonia; and most of the morpholine vinyl ether is recovered therefrom by fractional distillation, fractional condensation, or by other means.

The still residue may be allowed to settle, and then be centrifuged to remove the precipitated salt. The residual liquor separates into an aqueous caustic layer and a supernatant amine layer. The former is returned to the still and boiled to 128° C., and a further quantity of salt and an amine layer are removed.

Some morpholine ethyl vinyl ether is present in the distillate obtained during concentration of the mixture from the caustic treatment; and may be recovered by fractional distillation or other suitable treatment.

Morpholine ethyl vinyl ether present in the aqueous caustic solution can be recovered therefrom also by a concentration of the solution, followed by its extraction with benzene or other equivalent solvent. In one instance, approximately one-third of the said ether was present in this caustic layer. The caustic solution, or the residue thereof after an extraction with benzene or the like, can be used again in the process. The liquid amine layer or layers generally contain the major part of the morpholine vinyl ether produced, which is recovered therefrom by any suitable method, as by fractional distillation.

Frequently it is desirable to conduct the reaction between the $\beta\beta'$ dichlordiethyl ether and ammonia in a solution of a volatile solvent which is chemically inert to the reactants. This is particularly desirable for controlling the rate of reaction and the temperature in the mass of reactants where the mixture is initially heated to temperatures as high as 100° C. or higher. In this way undue rise in temperature is prevented. A solvent having a high absorptive capacity for ammonia, such as methanol, is very satisfactory for the purpose.

Example 3

In one instance, a solution of 300 grams of $\beta\beta'$ dichlordiethyl ether, 170 grams anhydrous ammonia, 2400 c. c. methanol, and 5 grams cuprous chloride were heated in an autoclave for 25 hours at 100°–110° C. The excess of ammonia then was evaporated, and methanol was added in amount sufficient to dissolve the amine salts. This solution was then treated with sodium hydroxide, and the sodium chloride and alcohol were removed from the resultant mixture. The remaining liquid was then extracted with isopropyl ether, and the extract was fractionally distilled. The morpholine ethyl vinyl ether was recovered by redistillation of the fraction boiling within the range 180°–215° C. at atmospheric pressure.

While it is preferred in the practice of the process to utilize molar ratios of ammonia to $\beta\beta'$ dichlordiethyl ether of around 4 or 5:1, other ratios within the range of from 2:1 to 20:1 and higher have been successfully employed, and satisfactory yields of morpholine ethyl vinyl ether secured. The use of a catalyst in the process is not essential to its successful operation.

The dimorpholinium chloride or homologue may be recovered directly from the reaction mixture resulting from the ammonia or morpholine treatment of the said ether. According to one procedure for recovering the intermediate chloride, the said reaction mixture was treated with sodium hydroxide or its equivalent in amount less than that needed to neutralize the solution and to convert the dimorpholinium chloride to the corresponding hydroxide. All excess ammonia, morpholine, morpholine vinyl ether, and water was vaporized and removed. The salty residue was extracted with hot alcohol. Dimorpholinium chloride was obtained from the alcohol extract by recrystallization.

Dimorpholinium chloride is very stable, and is very soluble in water and in the lower alcohols. It forms colorless crystals. Upon heating, it darkens somewhat around 280° C. and melts with decomposition near 300° C. Upon treatment with aqueous sodium hydroxide it forms a supernatant colored oily layer which is not soluble in benzene and is evidently an impure dimorpholinium hydroxide. On heating the caustic solution to over 100° C. this layer is gradually converted to morpholine vinyl ether, and becomes soluble in benzene.

The process of the invention is also adapted for the production of vinyl ethyl ethers and homologous ethers of the various homologues of morpholine, as for example, by the ammonia treatment in the manner described, of various $\beta\beta'$ dihalogenated dialkyl ethers, such as $\beta\beta'$ dichlor-di-isopropyl ether, or by the morpholine treatment of the same ether.

Upon reacting $\beta\beta'$ dichlor-di-isopropyl ether with ammonia in manner similar to the treatment of the dichlordiethyl ether in the examples supra, a product has been secured having properties similar to those of 4-morpholine 2-ethyl vinyl ether, which is evidently the tetramethyl homologue of morpholine ethyl vinyl ether. Mixed homologues, such as the reaction products of morpholine and $\beta\beta'$ dichlor-di-isopropyl ether, and of dimethyl morpholine with $\beta\beta'$ dichlordiethyl ether, likewise may be produced by the process.

Example 4

1110 parts by weight of $\beta\beta'$ dichlor-di-isopropyl ether and 3890 parts by weight of aqueous 28% ammonia were heated in an autoclave for six days, with a total time of about 30 hours at a temperature of from 90° to 120° C. The reaction product was concentrated by distillation, and unreacted ether and ammonia were removed, together with iron oxide. The residue was treated with a slight excess of sodium hydroxide and was evaporated, some of the resultant amines being carried into the aqueous distillate, and some separating in the still as a supernatant layer over a residue of caustic and brine. Separation and distillation of the amines yielded a fraction boiling in the range of from 120° to 230° C. Fractional distillation thereof yielded a fraction boiling at 145° to 150° C.

which was evidently dimethyl morpholine; and a fraction boiling at 230° to 240° C. which evidently was dimethyl morpholine isopropyl isopropenyl ether. This compound apparently has a structure corresponding to the formula

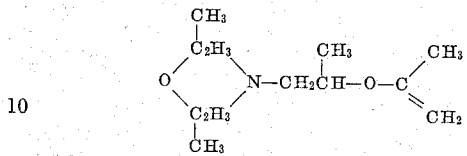

The last-named propylene homologue of morpholine ethyl vinyl ether is a colorless mobile liquid having the peculiar flat odor of morpholine ethyl vinyl ether. It is practically insoluble in water, but is a fairly strong base. It is completely miscible with methyl alcohol and with diethyl ether.

*Example 5*

86 parts of ββ' dichlor-di-isopropyl ether, 43 parts of morpholine, 20 parts of sodium hydroxide, and 20 parts of water, all parts by weight, were reacted (refluxed) for 15 hours at the boiling point of the mixture, or approximately 100° C. The resultant reaction products were then diluted with water and distilled to remove the unreacted ether and morpholine by steam distillation. The residue was extracted with isopropanol, and the extract was filtered to remove the insoluble sodium chloride. Dimethyl dimorpholinium chloride was then obtained by crystallization from this isopropanol solution of the amine chlorides. The former is a white, high-melting, stable solid, soluble in water and in alcohols. Heating this chloride with sodium hydroxide in alcohol yields an amine corresponding to a dimethyl derivative of morpholine ethyl vinyl ether, in the form of a colorless, mobile liquid, boiling at 215°–225° C., soluble in alcohols, slightly soluble in water, and strongly basic. The formula of this dimethyl morpholine ethyl vinyl ether may be written as follows:

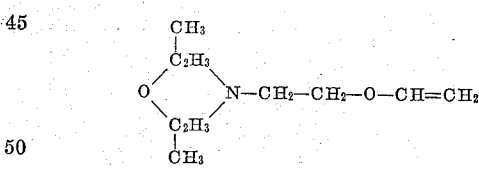

That fraction of the benzene extract recited in Example 1 which upon distillation boils within the range from about 126° C. to about 180° C. contains substantial amounts of morpholine, formed by the ammonia treatment of the ββ' dihalogenated di-ethyl ether. Preferably such fraction is recycled and reused in the process for the production of the morpholine ethyl vinyl ether.

Many low-boiling volatile solvents other than isopropyl ether and benzene can be utilized in the extraction of the amines from the mixture resulting from the caustic alkali treatment. These solvents should be chemically inert with respect to the materials of the process, and should be substantially immiscible with water.

However, because of the difficulties met in separating these amines from water by distillation, it is generally preferred to avoid such solvent extraction, and to partially evaporate or concentrate the primary reaction mixture from the morpholine or ammonia treatment of the ether, thereafter partially neutralize the solution with sodium hydroxide, and evaporate further to remove combined ammonia and water. An excess of sodium hydroxide is then added, and the mixture is refluxed until the dimorpholinium hydroxide is completely decomposed with the formation of amines, which are then separated by gravity as an amine layer. The latter is fractionally distilled to recover the various amines present.

The reaction between the dihalogenated ether and ammonia may be carried out at pressures around atmospheric, but for the most efficient operation low superatmospheric pressures are preferred; and pressures around 50 to 55 pounds per square inch gauge have been uniformly satisfactory.

It will be seen from the foregoing description that the invention in its broader scope embraces the production of morpholine substituted vinyl ethers which in general are mobile, medium- or high-boiling liquids having structures corresponding to the general formula

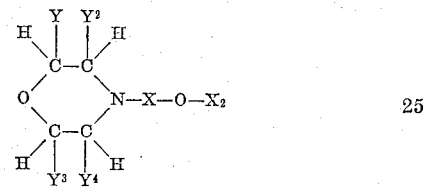

wherein $Y$, $Y^2$, $Y^3$, and $Y^4$, respectively, may represent an atom of hydrogen or an alkyl radical; $X$ may represent a saturated alkyl residue; and $X_2$ may represent an unsaturated alkyl residue.

I claim:

1. As a chemical compound, N morpholine 2-ethyl vinyl ether, the same being a mobile, colorless liquid having a boiling point of 209°–211° C., and a specific gravity of 1.00 at 20° C.

2. As a chemical compound, dimethyl morpholine isopropyl isopropenyl ether, the same being a colorless mobile liquid having a boiling range of from about 230° C. to about 240° C., practically insoluble in water, completely miscible with methyl alcohol and with diethyl ether, and being a fairly strong base.

3. As a chemical compound, dimethyl morpholine ethyl vinyl ether, the same being a colorless, strongly basic liquid boiling at from 215° C. to 225° C., soluble in alcohols, and slightly soluble in water.

4. In the process of making a morpholine alkyl vinyl ether, the step which comprises reacting a morpholine with a ββ' dihalogenated di-alkyl ether while maintaining the reaction mixture alkaline.

5. In the process of making a morpholine substituted ethyl vinyl ether, the step which comprises reacting morpholine with a dialkyl substituted ββ' dichlor-di-ethyl ether in an alkaline medium.

6. In the process of making a morpholine substituted ethyl vinyl ether, the step which comprises reacting a dialkyl substituted morpholine with ββ' dichlor-di-ethyl ether in an alkaline medium.

7. The process of making morpholine ethyl vinyl ether, which comprises reacting morpholine in alkaline solution with ββ' dihalogenated di-ethyl ether, treating the resultant reaction mixture with an excess of a caustic alkali, and recovering the N morpholine 2-ethyl vinyl ether thus produced.

8. The process of making morpholine ethyl vinyl ether, which comprises reacting a ββ' dihalogenated di-ethyl ether with ammonia in a molar ratio of at least 2 of ammonia to 1 of the ether in the presence of an aqueous alkaline solution, treating the reaction mixture with an aqueous caustic alkali solution, fractionally distilling the resultant reaction mixture, and separately recovering therefrom a fraction which includes that distilling over at 209°–211° C.

9. The process of making morpholine alkyl vinyl ether, which comprises reacting a $\beta\beta'$ dihalogenated di-alkyl ether with ammonia in a molar ratio of at least 4 of ammonia to 1 of the ether in aqueous alkaline solution, treating the reaction mixture with an excess of an aqueous caustic alkali solution, concentrating the resultant mixture and separating the same into a plurality of layers including a layer rich in morpholine alkyl vinyl ether, fractionally distilling the latter, and separately recovering the fraction containing the morpholine alkyl vinyl ether.

10. The process of making morpholine ethyl vinyl ether, which comprises reacting a $\beta\beta'$ dichlor-di-ethyl ether with ammonia in a molar ratio of at least 4 of ammonia to 1 of the ether in aqueous alkaline solution, treating the reaction mixture with an excess of aqueous caustic alkali solution, concentrating the resultant mixture, fractionally distilling the latter, and separately recovering a fraction distilling over within the range 180°–215° C. and containing the morpholine ethyl vinyl ether.

11. The process of making a morpholine substituted alkyl vinyl ether, which comprises reacting $\beta\beta'$ dichlor-di-isopropyl ether with ammonia in a molar ratio of at least 3 mols of ammonia to 1 mol of the ether in the presence of an alkaline solution, treating the resultant reaction mixture with an excess of a strong alkali, and recovering the substituted morpholine vinyl ether thus produced.

12. In the process of making a morpholine substituted alkyl vinyl ether, the step which comprises reacting $\beta\beta'$ dichlor-di-isopropyl ether with ammonia in a molar ratio of at least 5 of ammonia to 1 of the said ether.

13. The process of making a morpholine alkyl vinyl ether, which comprises reacting under pressure a $\beta\beta'$ dihalogenated dialkyl ether with ammonia in a molar ratio of at least 5 of ammonia to 1 of the dihalogenated ether, treating the resultant mixture with an excess of a caustic alkali, and recovering the morpholine alkyl vinyl ether thus produced.

14. The process of making morpholine ethyl vinyl ether, which comprises reacting $\beta\beta'$ dichlor-di-ethyl ether with ammonia in a molar ratio of at least 5 of ammonia to 1 of the dihalogenated ether, concentrating the mixture, treating the resultant mixture with an aqueous solution of caustic alkali, thereby forming morpholine ethyl vinyl ether, stratifying the mixture into a plurality of layers including an amine layer and an aqueous caustic layer, separating the above-mentioned layers, separately fractionally distilling the amine layer and the caustic layer, and separately recovering the fractions of the respective layers distilling within the range 180°–215° C. at atmospheric pressure.

15. In the process of producing a morpholine-substituted alkyl vinyl ether, the steps which comprise reacting in an alkaline medium a morpholine with a $\beta\beta'$ dihalogenated dialkyl ether, treating the resultant reaction product with an excess of a caustic alkali, and recovering the morpholine-substituted alkyl vinyl ether thus produced.

16. The process of making a morpholine-substituted alkyl vinyl ether, which comprises reacting with ammonia an ether selected from the group thereof consisting of $\beta\beta'$ dihalogenated diethyl ether and $\beta\beta'$ dihalogenated di-isopropyl ether, in a molecular ratio of at least 3 mols of ammonia to 1 mol of the ether, in the presence of an alkaline solution, treating the resultant reaction mixture with an excess of a strong alkali, and recovering the morpholine-substituted ether thus produced.

17. The process of making a morpholine alkyl vinyl ether, which comprises reacting a $\beta\beta'$ dihalogenated dialkyl ether with ammonia in a molar ratio of at least 4 of ammonia to 1 of the ether, while maintaining the reaction mixture alkaline, treating the resultant reaction mixture with an excess of an aqueous caustic alkali solution, thereby producing a morpholine alkyl vinyl ether, and recovering the latter.

18. The process of making morpholine ethyl vinyl ether, which comprises reacting $\beta\beta'$ dichlor-di-ethyl ether with ammonia in a molar ratio of at least 4 of ammonia to 1 of the ether, in aqueous alkaline solution, treating the reaction mixture with an excess of aqueous caustic alkali, concentrating the resultant mixture thereby separating it into a plurality of layers including a layer of caustic liquor, further concentrating the last-named layer, separating from the concentrated liquor the amine layer containing the morpholine ethyl vinyl ether thus formed, fractionally distilling the amine layer, and separately recovering the fraction boiling at 209° to 211° C. at atmospheric pressure.

19. In the process of producing a morpholine alkyl vinyl ether, the step which comprises reacting a morpholine, with a $\beta\beta'$ dihalogenated dialkyl ether in solution in a volatile organic solvent which is chemically inert to the reactants, while maintaining the reaction mixture alkaline.

20. A morpholine-substituted alkyl vinyl ether, the same being a mobile liquid having a structure corresponding to the general formula

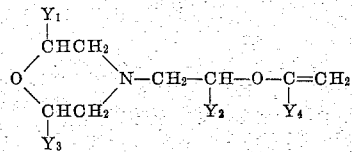

wherein $Y_1$, $Y_2$, $Y_3$ and $Y_4$ respectively represent radicals selected from the group consisting of saturated alkyl radicals and hydrogen.

21. The process of making a morpholine alkyl vinyl ether, which comprises reacting a $\beta\beta'$ dihalogenated dialkyl ether with ammonia in a molar ratio of at least two of ammonia to one of the ether while maintaining the reaction mixture alkaline, thereby intermediately forming a morpholine which reacts with additional $\beta\beta'$ dihalogenated dialkyl ether, treating the resultant reaction mixture with an excess of an aqueous caustic alkali solution, thereby producing a morpholine alkyl vinyl ether, and recovering the latter.

ALEXANDER L. WILSON.